Oct. 14, 1952        W. K. ERGEN        2,614,251
FLIGHT INSTRUMENT Filed July 31, 1946        3 Sheets-Sheet 1

INVENTOR.
WILLIAM K. ERGEN.

BY
George N. Fisher
ATTORNEY

Oct. 14, 1952  W. K. ERGEN  2,614,251
FLIGHT INSTRUMENT
Filed July 31, 1946  3 Sheets-Sheet 2

INVENTOR.
WILLIAM K. ERGEN

Patented Oct. 14, 1952

2,614,251

UNITED STATES PATENT OFFICE 2,614,251

FLIGHT INSTRUMENT

William K. Ergen, Princeton, N. J., assignor to Minneapolis-Honeywell Regulator Company, Minneapolis, Minn., a corporation of Delaware Application July 31, 1946, Serial No. 687,421

27 Claims. (Cl. 343—15)

This invention relates to the field of aircraft instruments, and more particularly to aircraft instruments which provide supervision of the relationship between the actual course being made good by a craft and a particular predetermined course.

It is an object of the invention to provide means for indicating on-course and off-course conditions of a craft, with respect to a direct course passing through two selected locations, by the use of radio relaying base stations having known spatial relationships to the selected locations, and cooperating with radio transmitting and receiving means carried by the craft.

It is another object of the invention to provide means as described above in which there is an electric bridge having a quartic balance equation of the same type as the quartic equation of the desired course, in bi-polar coordinates on the radio relaying base stations as poles, and in which means are provided for adjusting the coefficients of the bridge equation to make it identical with the equation of any selected course within a wide range.

It is another object of this invention to provide means as described above which also includes means altering the bridge so that its balance equation becomes a quadratic of the same type as certain degenerate cases of the general equation, for which the sensitivity of the unaltered bridge is zero.

A more specific object of the invention is to provide, in a device of the class described above, means mechanically combining physical inputs, having the form of rotations of certain shafts, to give mechanical outputs equal to the sums and differences of the various inputs, and to actuate variable resistors comprised in arms of an electric bridge, in accordance with the mechanical outputs.

Another specific object of the invention is to provide, in a device of the class described above, mechanical and electrical means combining physical inputs having the form of rotations of certain shafts, to give changes in the resistances of variable resistors proportional to the sums and differences of the inputs in various combinations necessary to the adjustment of an electric bridge so that its balance equation is identical with the equation of a selected straight line in bipolar coordinates.

A further specific object of the invention is to provide, in a device of the class described above, an electric bridge having a quartic balance equation of the same type as the equation of the course to be followed, in bipolar coordinates on two fixed relaying stations as poles, and comprising a plurality of parallel circuits, the two elements of each circuit being proportional to the sum and difference, respectively, of two quantities, each of two arms of the bridge comprising one of the parallel circuits, and a third arm of the bridge comprising two of the parallel circuits connected in series.

A further broad object of the invention is to provide, in a device of the class described above, electrical bridge means for solving a quartic equation of a particular type for any values of its coefficients within a wide range.

A still further object of the invention is to provide a method for indicating the relation between the actual course of a craft, over a particular terrain, and a predetermined course over the same terrain, the method comprising determining the equation of the desired course on a system of bipolar coordinates whose poles are at two points of known location, providing an electric bridge whose balance equation is of the same quartic type as that of the desired course, computing coefficients making the calculated equation identical with the balance equation of the bridge, adjusting variable resistances comprised in the bridge in accordance with the calculated coefficients and with distances between the craft and the known points, and operating a reversible indicator from the output of the bridge.

Yet another object of the invention is to provide means for indicating departure of a craft from a predetermined course with respect to two spaced points of known location, including first means continuously responsive to the distances between the craft and the known points and second means continuously indicating whether or not the relationship between the distances corresponds to a position of the craft on the desired course.

Another more specific object of the invention is to provide a computer for certain quartic equations comprising a bridge circuit including a plurality of impedance members, means varying the impedances of certain of said members in accordance with different linear functions of the variable or variables of the equations, the impedance members being so arranged in the bridge that its balance equation is a quartic of a desired type.

Another more specific object of the invention is to provide a computer for certain quartic equations comprising a bridge circuit including a plurality of impedance members, means varying the impedances of certain of said members in accordance with different linear functions of the variable or variables of the equations, the impedance members being arranged in parallel pairs in arms of the bridge so that its balance equation is a quartic of a desired type.

A further object of the invention is to provide means supervising the movement of an object with respect to two selected points, which include a balanceable electric network, means coordinating the electrical condition of the network with the spatial condition including said object and said points, and means coordinating impedances in said network with the distances between said object and said points.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

General considerations

Figure 1:
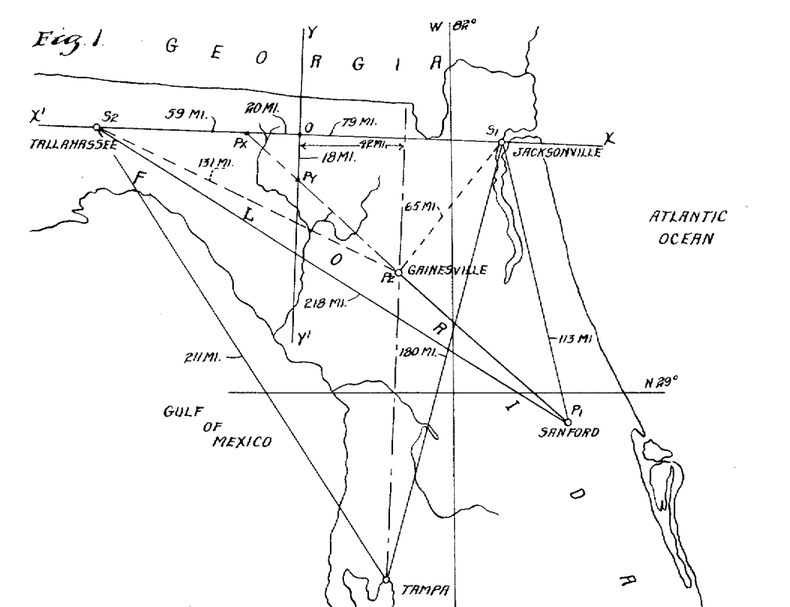
Figure 1 is a simplified cartographic presentation of the type of problem which the present invention is designed to solve, and is correlated with Figure 3 by the use of the same indicia for certain points in both figures.

Figure 1 is a simplified map of a portion of the State of Florida, over which area it will be assumed that flights using my invention are to be made. The relaying stations are considered to be located at Tallahassee and Jacksonville. By reference to the map the distances $d_1$ and $d_2$ from any other point in the area to Jacksonville and Tallahassee can be measured: the distances are assigned to the letters arbitrarily so that $d_2$ is not less than $d_1$. Suppose for the sake of illustration that it is desired to fly between Gainesville and Sanford. The distances from Tallahassee to Jacksonville, Gainesville, and Sanford are found to be 158 miles, 131 miles, and 218 miles, and those from Jacksonville to Gainesville and Sanford are found to be 65 miles and 113 miles, all respectively. Then a point on the desired course between Gainesville and Sanford may have any distance from Jacksonville between 65 and 113 miles or any distance from Tallahassee between 131 and 218 miles. However, it is not possible to consider these distances entirely independently: for any particular value of either of these distances within its permitted range in the area in which the craft is known to be located, there is a unque value of the other distance for which the craft is on the course, and for all other values of the second distance the craft is off the course. This invention functions to provide an instrument whose input is a pair of radio signals relayed from ground stations at the known locations, and whose output is an indication, on an instrument dial, that the craft is on course or that it has deviated to one side or the other of the proper course.

Figures 2, 3:
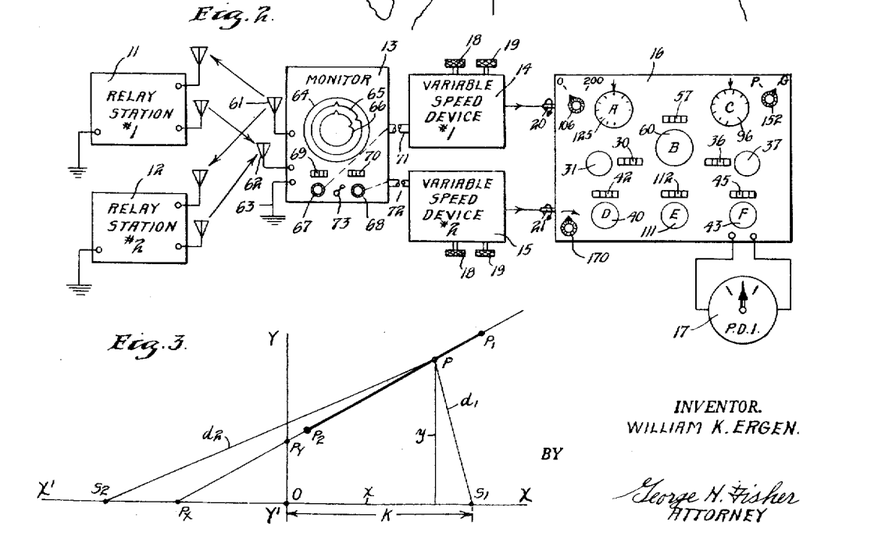
Figure 2 is a block diagram of a complete system embodying the invention, and includes components which are not of themselves novel but which I have combined in a novel fashion with other components which are themselves novel.
Figure 3 illustrates the mathematical analysis of the problem on which my solution is based, and is correlated with Figure 1 by the use of the same indicia for certain points of both figures.

Apparatus capable of performing the above function is shown generally in Figure 2 to comprise first and second relaying base stations 11 and 12 of known, fixed location, a distance monitor 13 carried by the craft, first and second variable speed devices 14 and 15, a computer 16, and an indicator 17. Members 11 to 15 cooperate, as will more fully be described, to provide to computer 16 a pair of mechanical inputs 20 and 21 in the form of mechanical rotations related in magnitude to the respective distances between the craft carrying monitor 13 and base stations 11 and 12. Computer 16 then functions to determine whether the magnitudes of these inputs have a relationship corresponding to a position of the craft on the desired course, or whether their relationship corresponds to some position of the craft to the left or right of the course, and furnishes a signal to indicator 17 which causes it to give the proper on-course or off-course indication, by which the pilot of the craft is guided in operation of the controls.

Before proceeding with a detailed consideration of the components making up the complete apparatus, a more complete analysis of the problem and its solution is in order.

Theoretical considerations

Referring first to Figure 3, the base stations are shown at $S_1$ and $S_2$, separated by a distance $2K$, and the course to be flown is the line $P_1P_2$. The X-axis of a set of Cartesian coordinates passes through $S_2$ and $S_1$, with the origin O midway between them, and $P_1P_2$ is continued to cut the Y-axis at $P_y(o, n)$ and the X-axis at $P_x(m, o)$. The equation for this straight line, in the intercept form, is $$\frac{x}{m}+\frac{y}{n}=1 \qquad (1)$$

or $$nx+my=mn \qquad (2)$$

By dividing through by $$\sqrt{n^2+m^2}$$

and giving the resulting complicated coefficients the values $\alpha$, $\beta$, and $\gamma$, this equation becomes $$\alpha x+\beta y-\gamma=0 \qquad (3)$$

here $$\alpha^2+\beta^2=1 \qquad (4)$$

Now considering any point $P(x, y)$ on the line $P_1P_2$, distant from $S_1$ and $S_2$ by $d_1$ and $d_2$, so assigned that $d_2 \geq d_1$, the following equations are evident from the Pythagorean theorem:

$$d_1^2 = (K-x)^2 + y^2 \quad (5)$$

and $$d_2^2 = (K+x)^2 + y^2 \quad (6)$$

whence $$x = \frac{(d_2^2 - d_1^2)}{4K} \quad (7)$$

and $$y = \pm (1/4K)\sqrt{8K^2(d_1^2+d_2^2)-(d_2^2-d_1^2)^2-16K^4} \quad (8)$$

Substitution of (7) and (8) into (3) and rearrangement of terms yields $$\alpha(d_2^2-d_1^2)-4K\gamma =$$
$$\mp \beta\sqrt{8K^2(d_1^2+d_2^2)-(d_2^2-d_1^2)^2-16K^4} \quad (9)$$

By squaring this equation and again rearranging, it is possible to derive the rational equation $$(d_2^2-d_1^2)^2 - 8K^2\beta^2(d_1^2+d_2^2) -$$
$$8K\alpha\gamma(d_2^2-d_1^2) +$$
$$16K^2(\gamma^2+K^2\beta^2) = 0 \quad (10)$$

This is the equation of the line $P_1P_2$ in bipolar coordinates, and there is implied the assumption that within the limits of usefulness of the apparatus the difference between a rectilinear course on a map and a direct course on the surface of the earth is not significant; this has been found in practice to be the case.

Figure 4:
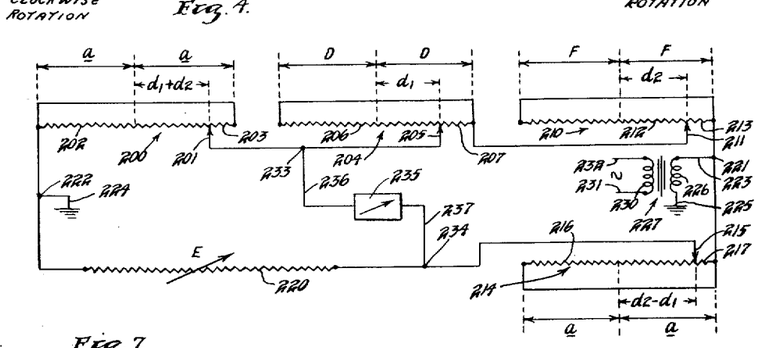
Figure 4 is a simplified diagram of the electric bridge which is used in my invention, and which has a balance equation of the desired type.

In Figure 4 there is given the wiring diagram of a bridge whose balance equation can be shown to be $$(d_2^2-d_1^2)^2 + 2a^2\left(\frac{E}{D}-1\right)d_1^2 +$$
$$2a^2\left(\frac{E}{F}-1\right)d_2^2 + a^4 - 2a^2E(D+F) = 0 \quad (11)$$

For any particular value of $a$, Equation 11 becomes identical with Equation 10 if $$D = \frac{1}{2}\sqrt{\frac{a^2-4K^2\beta^2-4K\alpha\gamma}{a^2-4K^2\beta^2+4K\alpha\gamma} \cdot \frac{a^4-16K^2(\gamma^2+K^2\beta^2)}{a^2-4K^2\beta^2}} \quad (12)$$

$$E = \frac{1}{2a^2}\sqrt{\frac{[(a^2-4K^2\beta^2)^2-16K^2\alpha^2\gamma^2][a^4-16K^2(\gamma^2+K^2\beta^2)]}{a^2-4K^2\beta^2}} \quad (13)$$

$$F = \frac{1}{2}\sqrt{\frac{(a^2-4K^2\beta^2+4K\alpha\gamma)}{(a^2-4K^2\beta^2-4K\alpha\gamma)} \cdot \frac{[a^4-16K^2(\gamma^2+K^2\beta^2)]}{(a^2-4K^2\beta^2)}} \quad (14)$$

The bridge of Figure 4 is shown to comprise a first circuit including a resistance winding 200, whose total resistance is $2a$, and a slider 201 displaced from the center of the winding by an amount $d_1+d_2$. The slider divides the winding 200 into two portions 202 and 203 whose resistances, $a+(d_1+d_2)$ and $a-(d_1+d_2)$, are connected in parallel. The bridge includes second, third and fourth circuits similar to that just described: slider 205 divides winding 204 of the second circuit into two portions 206 and 207 whose resistances are $D+d_1$ and $D-d_1$; slider 211 divides winding 210 of the third circuit into two portions 212 and 213 whose resistances are $F+d_2$ and $F-d_2$; and slider 215 divides winding 214 into two portions 216 and 217 whose resistances are $a+(d_2-d_1)$ and $a-(d_2-d_1)$. The bridge also includes a variable resistor 220, input terminals 221 and 222 and output terminals 233 and 234. The bridge is energized from a transformer 227 whose primary winding 230 is connected to a suitable source of alternating voltage by conductors 231 and 232, and whose secondary winding 226 is connected to the bridge input terminals by conductor 223 and ground connections 224 and 225. A suitable unbalance indicator 235 is connected to the output terminals of the bridge by conductors 236 and 237.

A study of the bridge in Figure 4 makes it evident that the greatest sensitivity is obtainable in general when $a$ is equal to $(d_1+d_2)$. If $d_1+d_2$ varies over a considerable range, it is desirable to have $a$ adjustable so that it can be made somewhat larger than the largest value of $d_1+d_2$ in which the instrument can operate, or reduced to maintain the sensitivity of the instrument for low values of $d_1+d_2$.

Figure 6:
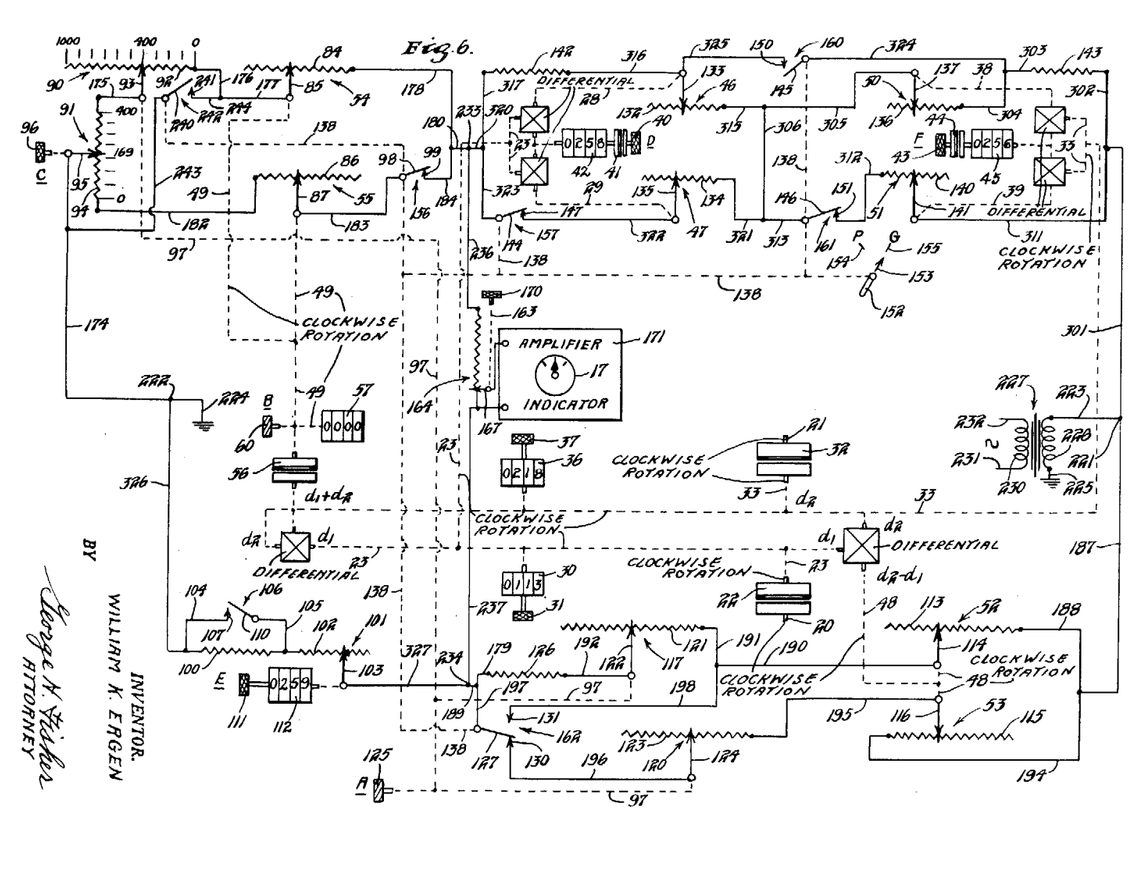
Figure 6 is a wiring diagram, with mechanical features added, more clearly disclosing the construction and connections of a novel computer as used in the practice of my invention and as indicated generally in Figure 2.

A physical embodiment of a bridge of the general character of that of Figure 4 but capable of adjustment for various values of $a$, D, E, and F has been designed, as shown in Figure 6, and it has been found that certain practical limitations exist on the relative values of the various constants. Thus, $$d_2 \geq d_1 \quad (15)$$

$$F \geq (d_2)_{max} \quad (16)$$

$$D \geq (d_1)_{max} \quad (17)$$

and $$a \geq (d_1+d_2)_{max} \quad (18)$$

where the subscript "max" signifies the maximum value the particular quantity is to assume for any particular flight. In practice it is found sufficiently exact to assume values for $a$ in multiples of 50.

The sensitivity of the instrument has been found to decrease for included angles, between the directions of $d_1$ and $d_2$, less than 30° or greater than 150°, and also for values of the angle $P_1P_xO$ near odd multiples of $$\frac{\pi}{2}$$

A special adaptation of the bridge for the special case of exact odd multiples of $$\frac{\pi}{2}$$

has been designed and will be described after the general case has been more completely discussed.

Equation 11 is a quartic, and I have found that for a bridge circuit to have a quartic balance equation, the bridge must include impedance members whose impedances vary as functions of the variable or variables being considered. If the variables are linear at least four such members are necessary at least two of the impedance members must be connected in parallel, and no two of these members may be connected in series only in any leg of the bridge, nor may any of these members contained in the same leg be linearly interdependent. If functions of the variable of a higher order are used, the number of impedances may be reduced accordingly. In the preferred form of the invention parallel impedance pairs are located in opposite legs of the bridge, which also includes further impedance members also variable as functions of the variable considered, since the quartic balance equation of this particular bridge is of the same type as the equation of the course in bipolar coordinates.

In the subjoined claims the bridge is sometimes referred to by the generic term "balanceable network," which may be defined as a number of impedance members interconnected to have input and output terminals and adjustable so that the output voltage varies through a zero value: the "balance" condition of the network is that to which the output voltage is zero. When the term "bridge" is used, it is to be given the meaning set forth in the American Standard Association publication "American Standard Definitions of Electrical Terms," approved August 12, 1941.

*Detailed consideration of the computer*

Figure 5:
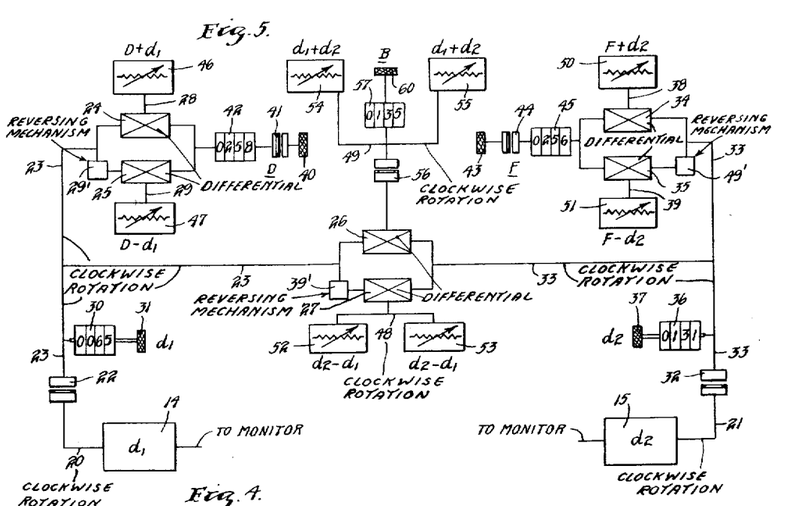
Figure 5 is a schematic showing of mechanism combining the mechanical inputs from certain motors and manually operable knobs to give desired additive and subtractive mechanical outputs.

As previously pointed out, the lower left arm of the bridge of Figure 4 is shown to comprise a single variable resistance having a value E. The upper left arm of the bridge is shown to comprise two resistances in parallel, having the values $a+(d_1+d_2)$ and $a-(d_1+d_2)$. The lower right arm of the bridge is shown to comprise two resistances in parallel, having the values $$a+(d_2-d_1)$$

and $a-(d_2-d_1)$. The upper right arm of the bridge is shown to be a series connection of two similar parallel circuits, one having values $D+d_1$ and $D-d_1$, and the other having values $F+d_2$ and $F-d_2$. Certain of these sums and differences are obtained in purely mechanical fashion as best shown in Figure 5.

In this figure, shafts 20 and 21 are shown as rotated by devices 14 and 15. Shaft 20 delivers its rotation to one member of a clutch 22 having an output shaft 23 which provides a first mechanical input to a first pair of mechanical differentials 24 and 25 and to a second pair of mechanical differentials 26 and 27. A counter 30 and a manually rotatable knob 31 are also connected to shaft 23, as by suitable gearing, so that they are ordinarily driven with the shaft. However, if manual force is applied to knob 31, clutch 22 may slip and the reading of counter 30, as well as the mechanical inputs to differentials 24, 25, 26, and 27, may be adjusted independently of member 14.

Shaft 21 delivers its rotation to one member of a clutch 32 having an output shaft 33 which provides a first mechanical input to a third pair of mechanical differentials 34 and 35, and a second mechanical input to differentials 26 and 27. A counter 36 and a manually rotatable knob 37 are also connected to shaft 33 as by suitable gearing, so that they are ordinarily driven with the shaft. However, if manual force is applied to knob 37, clutch 32 may slip and the reading of counter 36, as well as the mechanical inputs to differentials 34, 35, 27, and 26, may be adjusted independently of member 15.

A third manual knob 40 provides a second mechanical input to each of differentials 24 and 25 through a clutch 41: a counter 42 is included in this assembly. Similarly, a fourth knob 43 provides a second mechanical input to each of differentials 34 and 35 through a clutch 44, and a counter 45 is included in this assembly. Knobs 40 and 43 are rotated through angles D and F respectively as indicated on counters 42 and 45.

The differentials provided in this mechanical arrangement drive the shafts of variable resistors, so that the resistance of each resistor depends on the mechanical inputs to the differentials. Thus, differential 24 drives variable resistor 46 by output shaft 28; differential 25 drives variable resistor 47 by output shaft 29; differential 34 drives variable resistor 50 by output shaft 38; and differential 35 drives variable resistor 51 by output shaft 39. Differential 27 drives each of a pair of variable resistors 52 and 53 through output shaft 48, and differential 26 drives each of a pair of variable resistors 54 and 55 through a clutch 56 and output shaft 49. A counter 57 and a fifth manually operable knob 60 are also connected to shaft 49, as by suitable gearing, so that they are ordinarily driven by differential 26. However, if manual force is applied to knob 60, clutch 56 may slip and the reading of counter 57, as well as the mechanical inputs to variable resistors 54 and 55, may be adjusted independently of the output from differential 26. Further explanation of the function of knob 60, which does not appear in the simplified showing of Figure 4, will be deferred until the basic bridge is completely explained.

The understanding of this mechanical system will be simplified by the following discussion of the directions of rotation of the various shafts: positive and negative rotations as here assigned are arbitrary.

Rotation of shaft 23, whether by knob 31 or by motor 14, in such a direction as to increase the reading of counter 30, is positive, and provides positive drive to differentials 24 and 26 and negative drive, by reason of reversing gears 29' and 39', to differentials 25 and 27. Rotation of knob 40 in a direction to increase the reading of counter 42 is positive, and provides positive drive to differentials 24 and 25. The resistance of resistor 46 increases with positive rotation of shaft 23 or of knob 40. The resistance of resistor 47 increases with positive rotation of knob 40 and decreases with positive rotation of shaft 23.

Rotation of shaft 33, whether by knob 37 or by motor 15, in such a direction as to increase the reading of counter 36, is positive, and provides positive drive to differentials 26, 27, and 34 and a negative drive, by reason of reversing gear 49', to differential 35. Rotation of knob 43 in a direction to increase the reading of counter 45 is positive, and provides positive drive to differentials 34 and 35. The resistance of resistor 50 increases with positive rotation of shaft 33 or of knob 43. The resistance of resistor 51 increases with positive rotation of knob 43 and decreases with positive rotation of shaft 33.

The resistance of resistor 52 increases and that of resistor 53 decreases with positive rotation of shaft 33 and with negative rotation of shaft 23. The resistance of resistor 54 increases and that of resistor 55 decreases with positive drive of shafts 23 and 33, and this change is accompanied by negative rotation of knob 60 and decrease in the reading of counter 57. Conversely, positive rotation of knob 60 causes a decrease in the resistance of resistor 54 and an increase in the resistance of resistor 55, and increases the reading of counter 57.

Positive rotation of shafts 23 and 33 accompanies movement of the craft away from the associated ground stations.

The resistance of resistor 46 is thus proportional to $D+d_1$, that of resistor 47 to $D-d_1$, that of resistor 50 to $F+d_2$, that of resistor 51 to $F-d_2$, that of resistor 52 to $d_2-d_1$, and that of resistor 54 to $d_1+d_2$. The movement of the slider of resistor 53 is proportional to $d_2-d_1$, and that of the slider of resistor 55 to $d_1+d_2$, but the resistors are so connected, as will later be described, that their resistances decrease from maximum rather than increasing from zero with change in $d_2-d_1$ and $d_1+d_2$, respectively.

As pointed out above, the upper right arm of the bridge of Figure 4 requires resistances of values $D+d_1$, $D-d_1$, $F+d_2$, and $F-d_2$; these are obtained from resistors 46, 47, 50, and 51 in Figure 5. In the bridge of Figure 4 values for $a\pm(d_1+d_2)$ and $a\pm(d_2-d_1)$ are also required: Figure 5 shows how the values of $d_1+d_2$ and $d_2-d_1$ are obtained, and for an understanding of the means by which these values are added to and subtracted from values for $a$, reference must now be made to Figure 6, in which elements previously identified bear the same reference numerals.

The bridge of Figure 6 is shown to have output terminals 233 and 234 and line and ground input terminals 221 and 222. The bridge is continuously energized from the secondary winding 226 of transformer 227 whose primary winding 230 is connected to a suitable source of alternating electric energy by conductors 231 and 232: energization of the bridge takes place through conductor 223 and ground connections 224 and 225.

The upper left arm of the bridge includes variable resistor 54, having a winding 84 and a slider 85, variable resistor 55, having a winding 86 and a slider 87, and two additional variable resistors 90 and 91, the former comprising a winding 92 and a slider 93, and the latter comprising a winding 94 and a switching slider 95. Sliders 85 and 87 are actuated simultaneously by shaft 49, and windings 84 and 86 are oppositely connected in a circuit presently to be traced, so that as the sliders move together the effective resistance of resistors 54 increases while that of resistor 55 decreases, and vice versa. Slider 95 is operated by a knob 96, and slider 93 is operated by a shaft 97. This arm of the bridge also includes blades 98 and 240 and fixed contacts 99 and 241 which cooperate to form a normally closed single pole single throw switch 156 and a normally open single pole single throw switch 242, respectively, of a multiple switch.

The lower left arm of the bridge comprises a fixed resistor 100 and a variable resistor 101 having a winding 102 and a slider 103: resistor 100 can be short circuited through conductors 104 and 105 by closing a switch 106 having a fixed contact 107 and a switch blade 110. Slider 103 is actuated by a manual knob 111 which also drives a counter 112 to indicate the magnitude $E$ of the rotation.

The lower right arm of the bridge includes variable resistor 52 having a winding 113 and a slider 114, variable resistor 53 having a winding 115 and a slider 116, a fixed resistor 126, and two additional variable resistors 117 and 120, the former comprising a winding 121 and a slider 122, and the latter comprising a winding 123 and a slider 124. Sliders 122 and 124 are operated by shaft 97 simultaneously with slider 93 by a manual knob 125. Sliders 114 and 116 are actuated simultaneously by shaft 48, and windings 113 and 115 are oppositely connected in a circuit presently to be traced, so that as the effective resistance of resistor 52 increases, that of resistor 53 decreases, and vice versa. A blade 127 and two fixed contacts 130 and 131 of the multiple switch previously referred to are also included in this arm of the bridge, and cooperate to comprise a two position single pole double throw switch 162 normally completing a circuit between blade 127 and contact 130.

The upper right arm of the bridge includes variable resistor 46 having a winding 132 and a slider 133 actuated by shaft 28, a variable resistor 47 having a winding 134 and a slider 135 actuated by shaft 29, a variable resistor 50 having a winding 136 and a slider 137 actuated by shaft 38, a variable resistor 51 having a winding 140 and a slider 141 actuated by shaft 39, a pair of fixed resistors 142 and 143, and switch blades 144, 145, and 146 cooperating with fixed contacts 147, 150, and 151, respectively, to comprise single pole single throw switches 157, 160, and 161 of the multiple pole switch previously referred to. Switches 157 and 161 are normally closed and switch 160 is normally open.

Switch blades 98, 127, 144, 145, 146, and 240 are connected to a shaft 138 for simultaneous operation by a handle 152 which also moves a pointer 153 between two indices 154 and 155. When pointer 153 is aligned with index 155 the bridge is in its normal condition for solving the general equation. When handle 152 is moved so that pointer 153 is aligned with index 154, the bridge is connected in a different fashion presently to be explained, for determining lines perpendicular to that joining the two base stations.

The winding 163 of a potential divider 164 comprises the load resistance of the bridge, and is connected between the output terminals 233 and 234 by conductors 236 and 237. Potential divider 164 has a slider 167 which is movable along winding 163 by a manual knob 170, and which acts as an input voltage control for an indicator 171 which may include an amplifier if necessary. The amplifier may be of any suitable type to supply an alternating output voltage which reverses in phase upon reversal of the phase of the input voltage. The amplifier may be energized from the same alternating source as transformer 75, or from self-contained batteries, as desired.

The output of the bridge is thus connected to a center-zero meter 17, and the meter is deflected in one direction on unbalance of the bridge in a first sense, and in the opposite direction on unbalance of the bridge in the opposite sense.

Circuit of the general bridge

Consideration of the bridge circuit will be facilitated by defining a number of parallel electric circuits. The first parallel circuit appears in the upper left portion of Figure 6 and comprises an upper branch, to be referred to as the $a+(d_1+d_2)$ branch, which may be traced from input terminal 222 through conductor 174, slider 95, the portion of winding 94 lying above slider 95, conductor 175, slider 93, the portion of winding 92 lying to the right of slider 93, conductors 176 and 177, slider 85, the portion of winding 84 lying to the right of slider 85, and conductors 178 and 180 to output terminal 233. The first parallel circuit also comprises a lower branch, to be referred to as the $a-(d_1+d_2)$ branch, which may be traced from input terminal 222 through conductor 174, slider 95, the portion of winding 94 lying below slider 95, conductor 182, the portion of winding 86 lying to the left of slider 87, slider 87, conductor 183, switch blade 98, fixed contact 99, and conductors 184 and 180 to output terminal 233. Switch 242 is connected between conductor 174 and conductor 176 by means of conductors 243 and 244. It is thus evident that the first parallel circuit comprises the upper left arm of the bridge, when switches 156 and 242 are in their normal positions.

A second parallel circuit is shown in the lower right portion of Figure 6 and comprises an upper branch, to be referred to as the $a+(d_2-d_1)$ branch, which may be traced from input terminal 221 through conductors 187 and 188, the portion of winding 113 lying to the right of slider 114, slider 114, conductors 190 and 191, the portion of winding 121 lying to the right of slider 122, slider 122, conductor 192, resistor 126, and conductors 179 and 189 to output terminal 234. The second parallel circuit also comprises a lower branch, to be referred to as the $a-(d_2-d_1)$ branch, which may be traced from input terminal 221 through conductors 187 and 194, the portion of winding 115 lying to the left of slider 116, slider 116, conductor 195, the portion of winding 123 lying to the right of slider 124, slider 124, conductor 196, fixed contact 130, switch blade 127, and conductors 197 and 189 to output terminal 234. Contact 131 of switch 162 is connected with conductors 190 and 191 by a conductor 198 for a purpose presently to be described. It is thus evident that the second parallel circuit comprises the lower right arm of the bridge when switch 162 is in its normal position.

Two further parallel circuits are shown in the upper right portion of Figure 6. The third parallel circuit is shown at the right, and comprises an upper branch, to be referred to as the $F+d_2$ branch, which may be traced from input terminal 221 through conductors 301 and 302, resistor 143, conductors 303 and 304, the portion of winding 136 lying to the right of slider 137, slider 137, and conductor 305 to conductor 306. The third parallel circuit also comprises a lower branch, to be referred to as the $F-d_2$ branch, which may be traced from input terminal 221 through conductors 301 and 311, slider 141, the portion of winding 140 lying to the left of slider 141, conductor 312, fixed contact 151, switch blade 146, and conductor 313 to conductor 306.

The fourth parallel circuit located to the left of the third and shown in the upper central portion of Figure 6, comprises an upper branch, to be referred to as the $D+d_1$ branch, which may be traced from conductor 306 through conductor 315, the portion of winding 132 lying to the right of slider 133, slider 133, conductor 316, resistor 142, and conductors 317 and 320 to output terminal 233. The fourth parallel circuit also comprises a lower branch, to be referred to as the $D-d_1$ branch, which may be traced from conductor 306 through conductor 321, the portion of winding 134 lying to the right of slider 135, slider 135, conductor 322, fixed contact 147, switch blade 144, and conductors 323 and 320 to output terminal 233. Switch 160 is connected between conductors 303 and 316, by conductors 324 and 325, for a purpose presently to be described. It is thus evident that the upper right arm of the bridge is comprised of a pair of parallel circuits connected in series, when switches 157, 160, and 161 are in their normal positions.

The lower left arm of the bridge as shown may be traced from input terminal 222 through conductor 326, resistor 100, the portion of winding 102 lying to the left of slider 103, slider 103, and conductor 327 to output terminal 234.

Knob 125, which adjusts resistors 90, 117, and 120, is associated with an indicator which moves with respect to a scale graduated in arbitrary units of A, when A is defined by the equation $$A = 2a - 600 \qquad (19)$$

For any setting of knob 125 the resistance of resistor 90 has a value A, and resistors 117 and 120 each have a resistance of $$\frac{A}{2}$$

since the total resistance of each is half that of resistor 90. Knob 96 is associated with an indicator which moves with respect to a scale graduated in arbitrary units of C, when C is defined in the equation $$C = a - (d_1 + d_2)_{max} \qquad (20)$$

For any setting of knob 96, resistor 91 is divided into portions having resistances C and $400-C$. Thus knobs 96 and 125 together are used to adjust the value of $a$ in Equation 11 to a suitable value just larger than the maximum value of $(d_1+d_2)$ to be encountered in any particular flight. The scales of A and C are shown adjacent resistors 90 and 91.

The bridge is designed on the basis of equivalence between 5.9 ohms of resistance and 1 mile of distance. The resistances of the various resistors, and their distance equivalents, are as follows:

| Unit | Resistance | Distance | Equivalent |
| --- | --- | --- | --- |
|  | *Ohms* | *Miles* |  |
| Resistor 90 | 5,900 | 1,000 | $2a-600$ |
| Resistor 54 | 1,180 | 200 | $200-(d_1+d_2)_{max}+(d_1+d_2)$ |
| Resistor 91 | 2,360 | 400 | $\begin{cases} a-(d_1+d_2)_{max}(=C) \\ 400-[a-(d_1+d_2)_{max}] \end{cases}$ |
| Resistor 55 | 1,180 | 200 | $(d_1+d_2)_{max}-(d_1+d_2)$ |
| Resistor 142 | 1,180 | 200 | $\}D+d_1$ |
| Resistor 46 | 2,360 | 400 |  |
| Resistor 50 | 2,360 | 400 | $\}F+d_2$ |
| Resistor 143 | 1,180 | 200 |  |
| Resistor 47 | 1,180 | 200 | $D-d_1$ |
| Resistor 51 | 1,180 | 200 | $F-d_2$ |
| Resistor 100 | 1,180 | 200 |  |
| Resistor 101 | 1,180 | 200 |  |
| Resistor 126 | 1,180 | 200 |  |
| Resistor 117 | 2,950 | 500 | $a-300$ |
| Resistor 120 | 2,950 | 500 | $a-300$ |
| Resistor 52 | 2,360 | 400 | $100+d_2-d_1$ |
| Resistor 53 | 2,360 | 400 | $300-(d_2-d_1)$ |

In practice, it is found that $D+d_1$ and $F+d_2$ can always be made greater than 200 miles. For maximum sensitivity, the resistor setting each of these values into the bridge is made up of an 1180 ohm (200 mile) fixed section as previously mentioned and a 2360 ohm (400 mile) variable section. When this expedient is resorted to, it is necessary for sliders 133 and 137 to be at the zero ends of their windings, not when $D+d_1$ and $F+d_2$ are zero, but when each of these has a value of 200 miles. This is accomplished by a mechanical offsetting of 200 miles in the gearing which drives the respective shafts.

The mechanical connections between shaft 48 and sliders 114 and 116 are also offset so that when $d_2-d_1$ has a zero value the actual resistances of resistors 52 and 53 correspond to 100 miles and 300 miles, respectively. This arrangement adapts the instrument for use over a range of values of $d_2-d_1$ of from $-100$ miles to $+300$ miles without reaching the ends of resistors 52 and 53. Theoretically, it is sufficient to let $d_2-d_1$ vary between 0 and 400 miles since $d_2$ is by definition the larger of the two distances. However, that arrangement would require the resetting of the instrument during flight whenever the craft crossed the Y axis (Figure 3) in order to interchange $d_1$ and $d_2$, and is therefore less desirable.

The exact similarity between the bridge of Figure 6 and the simplified bridge of Figure 4 must now be emphasized. The upper portion of the upper left arm of the bridge of Figure 6 has a total resistance, traced clockwise, of $$(400-C)+A+\{200-[(d_1+d_2)_{max}-(d_1+d_2)]\}$$

Similarly, the resistance in the lower portion of the upper left arm of the bridge of Figure 6 has a total resistance, traced counter-clockwise, of $C+\{(d_1+d_2)_{max}-(d_1+d_2)\}$. The reason why the resistances of resistors 54 and 55 have the values given in the braces is dependent not only on the construction of the bridge, but also on its method of use, and will be described subsequently.

Substituting in the above expressions the values of A and C given in Equations 19 and 20, the values simplify to $a+(d_1+d_2)$ for the upper portion of the circuit and $a-(d_1+d_2)$ for the lower portion. These values are the same as the left and right hand portions of the resistor comprising the upper left arm of the bridge of Figure 4, and the resistors are connected in parallel in both bridges.

The $D+d_1$ and $D-d_1$ and the $F+d_2$ and $F-d_2$ values in the upper right arm of the bridge of Figure 6 clearly correspond to the same values in the bridge of Figure 4, and the lower left legs of the two bridges are also identical by inspection.

It will be recalled that the sliders of resistors 52 and 53 have been offset so that the resistances of these resistors are 100 miles and 300 miles, respectively, when $d_2-d_1$ is zero, and that the resistance of resistor 52 increases while that of resistor 53 decreases with increase in $d_2-d_1$. The resistance of the upper portion of the lower right leg of the bridge of Figure 6 accordingly has the value $$200+\frac{A}{2}+[100+(d_2-d_1)]$$

and the resistance of the lower portion of the leg is $$\frac{A}{2}+[300-(d_2-d_1)]$$

Substituting the value of A given in Equation 19 and simplifying, these values become $a+(d_2-d_1)$ and $a-(d_2-d_1)$, respectively: these values are the same as the left and right hand portions of the resistor comprising the lower right leg of the bridge of Figure 4.

The purpose of knob 60 will now be explained. As pointed out, the resistances of windings 84 and 86 are equivalent to 200 miles, and therefore the actual useful range of the instrument is limited to a change in $d_1+d_2$ of 200 miles. However, in one flight it may be desirable to use the 200 mile range between $d_1+d_2=400$ miles and $d_1+d_2=600$ miles, while in another flight it may be desirable to use the 200 mile range between $d_1+d_2=300$ miles and $d_1+d_2=500$ miles. In the first case it is desirable that slider 85 be at the maximum resistance end of its travel when $d_1+d_2=600$ miles, and in the second case the slider should be at its zero position when $d_1+d_2=500$ miles. The function of knob 60 in Figure 5 is to set sliders 85 and 87 at their left hand stops for different values of $(d_1+d_2)_{max}$ set into the instrument by knobs 31 and 37, so that subsequent change in the resistances of these resistors will be from the desired maximum settings.

In Figure 2, the panel of the computer 16 is shown to include knobs 31, 37, 40, 43, 60, 96, 111, 125, and 170, switches 106 and 152, and counters 31, 36, 42, 45, 57 and 112: mechanical inputs 20 and 21 to the computer are also provided through conventional disengaging means, not shown.

Associated equipment

The computer described above is designed to cooperate with particular radio instruments, as described in my copending application Serial No. 622,461, filed October 15, 1945, and assigned to the assignee of the present application. The invention is not thus limited, however. The computer is adapted for use with any distance monitoring device, whether electrical or mechanical, capable of giving a pair of mechanical outputs proportional to the distances in question. Details of the structure and theoretical operation of any such monitoring devices comprise no part of the present invention, and are therefore not specifically illustrated.

As a basis for a complete understanding of the invention, however, the operation of a generalized radio instrument serviceable as unit 13 of Figure 2 will now be described. It must be borne in mind that this disclosure is made only for illustration, and that many monitoring devices with which the invention is well adapted to cooperate may occur to those skilled in the art. For confirmation and additional information relative to the radio principles here disclosed, reference is made to the April and May issues of "Q. S. T." for the year 1945.

The purpose of monitor 13 is to give a continuous indication of the distance between the craft in which it is mounted and each of the two fixed relay stations 11 and 12 in Figure 2. This is accomplished in each case by observing the time interval between the transmission of an electromagnetic pulse and the reception of the same pulse retransmitted from the relay station: since the speed of propagation of electromagnetic radiation in air is known, and the relay interval required at the relay station to receive and retransmit the radiation may be accurately determined, the interval observed is a measure of the distance between the station and the craft. The system operates on well known principles briefly reviewed in the next three paragraphs.

The speed of propagation of electromagnetic radiations has been determined with great accuracy to be 186,284 miles per second: that is, a radiation requires about 5⅓ microseconds to travel a mile. A measurement of the interval between the transmission of a pulse of electromagnetic radiation and its receipt would consequently be a measurement of the distance between the receiver and the transmitter, but involves the impossibility of determining at either end, without time lag, exactly when the function at the other end is performed. This difficulty can be avoided by measuring the time required for the radiation to travel from the transmitter over the required distance and to return, and dividing this time by two, if there is no loss of time at the point whose distance is to be measured. A reflected radiation, such as is used in absolute altimeters, is an example of this system.

It is not usually easy to determine, among all of the reflections of the radiated pulse, which one comes from the point in question. If a radio relay station is established at that point, however, to retransmit the pulse, the retransmitted pulse can be identified by its greater magnitude, and if the interval between transmission of the original pulse and reception of the retransmitted pulse, reduced by the relay interval, is divided by two, the resulting interval is a measurement of the distance desired. This procedure is simplified when the relay interval is constant, since it can then be balanced out of the instrument to begin with and given no further consideration, the indication thereafter being proportional to the desired distance.

In a conventional cathode ray oscilloscope tube, it is possible to cause the beam to trace a circle on the screen by applying alternating voltages of the same frequency to the pairs of deflecting plates in phase quadrature: the beam travels around the circle once for each cycle of the alternating or sweep voltage. If the sweep frequency is 93,142 cycles per second, the beam traces its cycle once while a signal pulse of electromagnetic radiation is traveling one mile and back. If a voltage pulse is impressed on an electrode in the axis of the cathode ray tube by transmission of the signal pulse, and a second voltage pulse is impressed on this electrode by the reception of the retransmitted pulse, the angular displacement about the circle between the traces of the two voltage pulses is a measure of the travel time of the radiation, and therefore of the distance to be determined. The transmitted pulse may be repeated each time the sweep voltage passes through a particular point in its cycle, so that the indication on the screen of the tube appears continuous.

The system requires a pulse transmitter, a pulse receiver, and the indicating oscilloscope in the moving craft, and a fixed relay station on the ground for each distance to be measured. Operation of the system depends on observation of the angle on the cathode ray screen between the transmitted and received pulses as described above. If a phase shifter is provided in the monitor it is possible, by operation of the phase shifter, to bring the trace of the transmitted pulse into coincidence with that of the received pulse. When this condition is reached, the amount of angular displacement of the phase shifter shaft is a measurement of the distance required, if considered in conjunction with quotient of 93,142 and the sweep frequency.

Such a device is shown schematically in Figure 2 where 61 is the transmitting antenna, 62 the receiving antenna, 63 the common ground, and 64 the cathode ray tube showing two pulsed sweeps 65 and 66 which may be provided in a single oscilloscope tube by electronic switching, for example. The manual phase shifters, shown at 67 and 68, are related to counters 69 and 70, and shafts 71 and 72 are independently effective to rotate the phase shifters when driven by variable speed devices 14 and 15 as will presently be described. A power switch 73 is also shown.

Variable speed drives 14 and 15 as shown in Figure 2 comprise essentially motors for driving the phase shifters. The devices are provided with manual knobs 18 and 19 which function to control the operation of the motors in the respective devices. In use, knobs 18 may be so set that the speeds of the motors contained in units 14 and 15 are proportional to the components of the speed of the craft with respect to the relay stations: each phase shifter is then actuated at such a rate that the retransmitted pulses appearing on the oscilloscope remain at fixed angular displacements with respect to the transmitted pulses. When this condition is reached, it is possible, by operation of the other knobs 19 acting through suitable differentials, not shown, to alter the relation between the driving motors and the phase shifters to change the phase angle between the two pulses so as to bring them into coincidence. The instrument is then said to be "synchronized" with respect to the relay stations and so long as the craft continues to move at the same rate with respect to the station, the pulses maintain this fixed relation. The rotation of the motors is transmitted not only to the phase shifter shaft in the monitor, but also by means of shafts 20 and 21, to the computer whose construction has been described.

A variable speed device suitable for use in this application is illustrated and described in detail in my copending application above referred to, and since the details thereof comprise no part of the present invention the device is not shown in detail in the present application.

*General operation of the invention*

The fullest application of my invention requires a network of relaying stations distributed throughout an area to be traversed so that a craft is never out of effective range of at least two of the stations. A map of the area is also required on such a projection and to such a scale that straight lines connecting various locations approximate with sufficient accuracy direct courses over the actual terrain. Such a map is shown in Figure 1.

In the illustrative example it is supposed that relaying stations are located with precision at Jacksonville and Tallahassee on the map. A set of Cartesian coordinates is superimposed on the map with its X-axis passing through Tallahassee and Jacksonville and its origin O midway between them. The distance between Jacksonville and Tallahassee is found from the map to be 158 miles, so K in Equations 5, 6, and so forth, is 79 miles.

The line joining Gainsville and Sanford is projected to cut the Y-axis at $P_y$ and the X-axis at $P_x$, giving a Y-intercept of $-18$ miles and an X-intercept of $-20$ miles. Equation 1 for this line has the coefficients $\alpha=+0.668$, $\beta=+0.744$, and $\gamma=-13.4$. The distances $d_{1_{max}}$ and $d_{2_{max}}$ measure 113 miles and 218 miles, respectively, giving $(d_1+d_2)_{max}$ a value of 331 miles. The first estimated value for $a$ was 400 miles, but the value of F calculated on this basis does not satisfy Equation 16. Calculated on the new value $a=500$, values for D, E, and F were found to be 258, 259, and 256, respectively. It should be pointed out that the occurrence of nearly identical values for these three constants is purely coincidental. Values for A and C were also calculated on the value $a=500$, and were found to be 400 miles and 169 miles, respectively.

To make the computer ready for operation the disengaging means are actuated so that the computer is free from the variable speed drives 14 and 15. Knobs 31 and 37 are set so that the readings of counters 30 and 36 have the maximum values of $d_1$ and $d_2$ for the proposed flight: counter 30 reads 113 and counter 36 reads 218. Sliders 85 and 87 may strike stops at the right hand ends of their traverses during this setting of knobs 31 and 37, and when this happens clutch 56 slips so that counter 57 gives a continuous reading of 200 miles. Knob 60 is now rotated until the stops at the left hand ends of the traverses of sliders 85 and 87 are reached, while clutch 56 slips. The resistance of resistor 55 is now zero, and that of resistor 54 corresponds to 200 miles, and counter 57 reads zero. Next D, E, and F are set by knobs 40, 111, and 43 so that counters 42, 112, and 45 read 258, 259, and 256, all respectively. Switch 106 is turned to its open or "200" position, and switch 152 is turned to its normal or "G" position. Knob 170 is turned so that the sensitivity of the amplifier is zero. Conductors 231 and 232 are connected to the source of alternating voltage and the computer is ready for use. This state of the instrument is shown in Figure 6.

The flight is conducted as follows. The craft takes off at Sanford and gains altitude, and the sensitivity control 170 of the amplifier is turned up. It will be recalled that counters 31 and 36 read 113 miles and 218 miles, respectively. The phase shifter knobs 67 and 70 of the monitor are adjusted so that their counters read 113 and 218: this may cause slight departure of the pulses from their zero position, depending on the exact location of the craft. The computer shafts are next engaged with the distance monitor, and the craft now heads off in the general direction of Gainsville as indicated by the compass, and proceeds on a straight line at a constant speed.

Observation of the oscilloscope now shows that the two pulses are moving around their circles. The knobs 18 of the variable speed device are turned to start the motors and adjust their speeds to proportionality with the components of the speed of the craft with respect to the two base stations. When this is accomplished the pulses stop rotating. Knobs 19 are next rotated until the transmitted and received pulses of each set are brought into coincidence, which simultaneously adjusts the monitor counters and counters 30 and 36 in the computer to give the distances from the two ground stations to the craft, no matter where the latter may happen to be located. The system is now synchronized with the movement of the craft in space. Continued movement of the craft at the same speed and in the same direction brings about no change in the positions of the pulses since the phase shifters are being driven at a speed exactly proportional to the movement of the craft. The counters continue to move, however, continuously indicating the instantaneous distances between the craft and the two ground stations.

By the setting of the various knobs on the computer before the flight, its balance equation has been made identical with that of the desired course of the craft, and the only variables, $d_1$ and $d_2$, are continuously maintained at the proper values by the variable speed devices. If the computer bridge is balanced, this signifies that the craft is on the proper course and no displacement of the needle of indicator 17 from its central position takes place. If the distances $d_1$ and $d_2$ do not have a relation corresponding to a position of the craft on the desired course, the bridge is unbalanced and a signal is transmitted to indicator 17 causing its needle to move in a direction indicative of the correction in the heading of the craft required to return it to the desired course. Any correction of the course of the craft will of course require readjustment of knobs 18 and 19 to alter the operation of motors 14 and 15 so that they operate at rates proportional to the components of the new velocity of the craft with respect to the ground stations. Such resynchronization is necessary each time the course of the craft is changed, but quickly becomes smaller and smaller as the craft is brought to its desired course.

Thus in a craft equipped with my instrument the pilot needs only to actuate the control surfaces of the craft in such a manner as to keep the needle of indicator 17 at its zero position and under these conditions the craft follows the desired course. As it proceeds along the course, knobs 31, 37, and 60 rotate, and counters 30 and 36 decrease in their readings, whereas the reading on counter 57 increases, until when the craft is at Gainsville counters 30 and 36 read 65 and 131 miles. Counter 57 reads 135 miles, the total of a 48 mile change in $d_1$ and an 87 mile change in $d_2$. This state of the instrument is shown in Figure 5.

If the flight is being conducted from Gainsville to Sanford the setting up of the instrument is carried out generally as outlined above.

The engagement of the distance monitor and the shafts 20 and 21 should even in this case be made when the appropriate counters on the computer and the distance monitor show the maximum distances, 113 and 218 miles. It is not necessary that the craft be at Sanford at the moment of engagement. If it is not there, the traces of the transmitted and received pulses on the oscilloscope of the monitor do not coincide, but that may be corrected: the phase shifters are rotated as before to bring the oscilloscope pulses into coincidence and this automatically makes the computer ready for use. When the flight is completed, counters 30 and 36 indicate 113 miles and 218 miles, and counter 57 reads 0.

A study of the foregoing description of the use of the computer will make it clear why the resistances of resistors 54 and 55 include the term $(d_1+d_2)_{max}$ as well as $d_1+d_2$. In the original setting of the instrument the resistors were advanced to their right hand stops by knobs 31 and 37, and then to their left hand stops by knob 60. The resistance of resistor 55 is thus zero and that of resistor 54 is maximum for settings of knobs 31 and 37 corresponding to $(d_1+d_2)_{max}$. After the computer is coupled to the member the pulses on the oscilloscope are brought to zero, which adjusts the rheostats to the position of the craft at a point nearer to the two ground stations: the sum of the distances between this other point and the stations is $d_1+d_2$. The actual displacement of the sliders on resistors 54 and 55 is therefore the difference between the original setting and the final setting, or $$(d_1+d_2)_{max}-(d_1+d_2)$$

It will be appreciated that the illustrative embodiment of the invention is constructed to operate within selected components of the instru by suitably selecting components of the instrument, its range may be extended or compressed.

The computer described above is of general application for any line in the area served by the bridge, but its sensitivity falls off to an unusable value when the "station angle" included between and lines $d_1$ and $d_2$ is less than 30° or greater than 150°. In an extended flight the instrument must be readjusted to new sets of relay stations as the craft proceeds along its course and the values of the various coefficients should be calculated before the flight begins. In the fullest use of my invention the coefficients for all the frequently used courses in an area will be precalculated and tabulated so that a flight chart can be set up giving the several sets of values and the counter readings at which readjustment of the instrument must take place for the various legs of the complete course.

The special case bridge

It was pointed out above that there are station angle limitations on the usefulness of the instrument, due to its lack of sensitivity in certain areas. The line joining the two fixed stations, for example, cannot be flown using my computer. It has also been found that for lines perpendicular to the line joining the stations the sensitivity of the instruments is zero. Since it is sometimes convenient, for example in aerial surveys, to be able to fly a series of parallel courses perpendicular to the line joining conveniently located portable relaying stations, means have been incorporated into my computer by which it can be altered to make possible the flying of these perpendicular courses.

The equation of a straight line perpendicular to the X-axis is $$x = \gamma \quad (21)$$

or, from Equation 7, $$d_2^2 - d_1^2 = 4K\gamma \quad (22)$$

Figure 7:
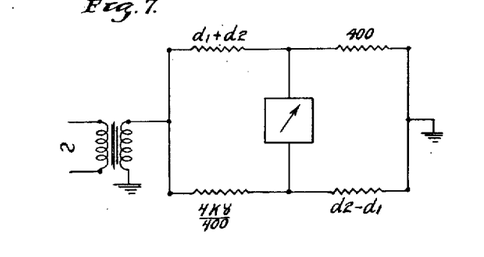
Figure 7 is a simplified wiring diagram illustrating the change in the circuit of Figure 4 brought about by the operation of certain switches.

In Figure 7 there is shown a bridge having a balance equation of this form, and the function of the multiple switch in Figure 6 is to convert the general bridge there shown into the bridge of Figure 7, when the switch is thrown to its "P" position. The switch functions as follows.

No change is brought about in the lower left arm of the bridge by actuation of the switch. In the upper left arm of the bridge, switch 156 opens the $a-(d_1+d_2)$ branch and switch 242 shorts out resistors 90 and 91 in the $a+(d_1+d_2)$ branch. This arm of the bridge therefore includes only resistor 54, which has a maximum value of 200 and which in this form of the bridge varies with $d_1+d_2$ instead of with $$(d_1+d_2)_{max} - (d_1+d_2)$$

as will presently be explained.

In the upper right arm of the bridge, switches 160 and 161 open the lower branches of the two parallel circuits, and switch 160 shorts out variable resistors 46 and 50: this arm of the bridge therefore includes only fixed resistors 142 and 143, equivalent to 400 miles.

In the lower right arm of the bridge switch 127 opens the lower branch of the parallel circuit and short circuits variable resistor 117 and fixed resistor 126: there remains in this arm of the bridge only variable resistor 52 which, it will be recalled, has a value $100+(d_2+d_1)$. In coupling the computer to the monitor, an offset of $-75$ miles has to be made between the monitor reading for the station $S_2$ and the setting of $d_2$ effective on resistor 52, and an offset of $+25$ miles has to be made between the monitor reading for station $S_1$ and the setting of $d_1$ effective on resistor 52, in order that the value of $d_2-d_1$ may actually be 100 miles less than that indicated to compensate for the $+100$ mile offset inserted in the original bridge. When this is accomplished, the resistance of the lower right arm of the bridge has the value of $d_2+d_1$.

The value $$\frac{4K\gamma}{400}$$

is set into this arm of the bridge by means of knob 111. From these values for the various arms of the bridge, it will be seen that the balance equation of the bridge is $$(d_2-d_1)(d_2+d_1) = 400\left(\frac{4K\gamma}{400}\right) \quad (23)$$

or $d_2^2-d_1^2=4K\gamma$, as previously pointed out.

As an example of the use of the modified computer, suppose it is desired to fly north on a line passing through Gainsville and perpendicular to the baseline joining Tallahassee and Jacksonville. For this course K is 79 miles as before and the value of $\gamma$ measured on the map is 42 miles. At Gainsville $d_1$ is 65 miles and $d_2$ is 131 miles as before so that $d_1+d_2$ has the value 196. This approaches the maximum value for $d_1+d_2$, which cannot exceed 200 miles when the bridge is in its altered condition.

The bridge is set up as follows. Switch 152 is moved to its "P" position. Knobs 40 and 43 may be left at any values they happen to have, since their resistances are shorted out of the circuit, and since if the rheostat should happen to be driven to their stops by rotation of the $d_1$ or $d_2$ shafts, further movement is possible through the differentials by reverse drive of the knobs, and no mechanical injury can come to the instrument. Knob 60 is operated until counter 57 reads 4 miles. It will be remembered that this counter reads zero when 200 miles are set into resistor 54. A change of 4 miles is thus required to set $d_1+d_2=196$ into this rheostat. By the above method of setting up the bridge, it will be apparent that the resistance of resistor 54 is this time adjusted to the value $d_1+d_2$ rather than the value it had in the general bridge. Knob 60 is now held stationary and knobs 31 and 37 are again turned until counters 30 and 36 read $d_1+25$, or 90 miles, and $d_2-75$, or 56 miles, respectively: clutch 56 slips during this process. Knobs 67 and 68 are turned until counters 69 and 70 read 65 and 131 miles respectively and computer and monitor are then engaged. Knob 111 has been turned so that counter 112 reads $$\frac{4K\gamma}{400}$$

or 33 miles. With the craft in uniform flight in a straight line, the oscilloscope pulses are first halted and then brought into coincidence: the indicators now show as before whether the craft is on course or off course.

In the foregoing specification I have described and illustrated a computer for indicating to the pilot of a craft what control operations are necessary to maintain the craft on a particular desired course, or to return the craft to that course if it deviates therefrom. The computer is primarily designed for cooperation with known aeronautical electronic devices, but it will be appreciated that it is adapted for use in any analogous environment where mechanical inputs of significance parallel to those of shafts 20 and 21 are available to drive the computer. It will also be apparent that the output of the computer can be used to control the craft directly by supplying a signal to an autopilot rather than to indicate needed control, or indeed to perform any function of parallel significance in the analogous environment referred to.

It will also be apparent that changes, such as substitution of equivalents or alteration of circuit values will occur to those skilled in the art in the practice of this invention in related applications. It is therefore to be understood that the present disclosure is illustrative only, and that such changes in detail are comprehended within the principle of the invention to the full extent indicated by the broad general meaning of the terms in which the appended claims are expressed.

I claim as my invention:

1. A balanceable impedance bridge having a quartic balance equation, said bridge including in two opposite arms thereof at least four variable impedance members, means for varying the impedances of said members as functions of a common variable no two of which functions have a linear relationship, at least two of said impedance members being connected in parallel, no two of said members being connected in series in any arm of said bridge.

2. A balanceable impedance bridge having a quartic balance equation, said bridge including at least four variable impedance members, means for varying the impedances of said members as functions of a common variable, no two of which functions have a linear relationship, and means connecting said members in parallel pairs in opposite arms of said bridge.

3. Means for indicating departure of a craft from a predetermined path with respect to two spaced points of known location, comprising, in combination, means continuously determining the distances between said craft and said points, a continuously energized network of variable impedance members arranged to give a zero output for a balanced relationship of said members, means for adjusting certain of said members in accordance with said distances, means adjusting others of said members so that said balanced relationship occurs when said destinations define a point on said path, and means indicating whether or not said balanced relationship exists.

4. Means for indicating departure of a craft from a predetermined path with respect to two spaced points of known location comprising, in combination: radio responsive means for continuously supplying outputs in accordance with the distances between the craft and the points; a balanceable computing network; means continuously modifying the condition of balance of said network in accordance with said outputs, and means further modifying the condition of balance of said network in accordance with the positions of the points relative to the path, so that said network gives a signal having characteristics determined by the position of the craft relative to the path; and means responsive to said signal to indicate the amount and direction of any departure of the craft from the path.

5. Means for indicating departure of a craft from a predetermined path comprising, in combination: a balanceable, normally energized impedance network having a balance equation, in two variables, of the same form as an equation of the path to be followed in terms of distances from two known points; means for adjusting said network so that its balance equation is identical with that for the particular path; means for continuously varying impedances in said network, corresponding to variables in the equation thereof, in accordance with the instantaneous distances between said craft and said points; and means energized from said network for continuously indicating the magnitude and sense of the unbalance of said network.

6. Means for indicating departure of a craft from a predetermined path comprising, in combination: a balanceable, normally energized impedance network having a quartic balance equation in two variables, of the same form as the equation of the path to be followed in bipolar coordinates on two points of known location as poles; means for adjusting said network so that the coefficients of its equation are identical with those of the equation for the particular path; means continuously varying impedances in said network, corresponding to variables in the equation thereof, in accordance with the instantaneous distances between said craft and said points; and means continuously indicating the magnitude and sense of the unbalance of said network.

7. Means for indicating departure of a craft from a predetermined path comprising, in combination: a normally energized impedance bridge, having a plurality of impedance members connected to form the arms thereof, and having a quartic balance equation, in two variables, of the same form as the equation of the path to be followed in bipolar coordinates on two points of known location as poles; means for adjusting impedance members in said bridge corresponding to the coefficients of its balance equation to make said equation identical with that for the particular path; means continually varying impedances in said bridge corresponding to variables in the balance equation thereof in accordance with the instantaneous distances between said craft and said points; means continually indicating the magnitude and sense of the unbalance of said bridge; and switch means altering the circuits comprising said bridge so that it has a balance equation of the same type as a degenerate case of said general quartic equation corresponding to a path of said craft perpendicular to the line joining said points.

8. Means for indicating departure of a craft from a predetermined path comprising, in combination: a normally energized impedance bridge, having a plurality of impedance members connected to form the arms thereof, and having a quartic balance equation, in two variables, of the same form as the equation of the path to be followed in bipolar coordinates on two points of known location as poles; means for adjusting impedance members in said bridge corresponding to the coefficients of balance equation to make said equation identical with that for the particular path; means continuously varying impedances in said bridge corresponding to variables in the balance equation thereof in accordance with the instantaneous distances between said craft and said points; means continually indicating the magnitude and sense of the unbalance of said bridge; and switch means short circuiting and open-circuiting impedance members in arms of said bridge to change its balance equation to that of a special quadratic case of said general quartic equation corresponding to a path of said craft perpendicular to the line joining said points.

9. Means for indicating departure of a craft from a predetermined path comprising, in combination: a normally energized impedance bridge including a plurality of parallel circuits, means for adjusting elements of each circuit in proportion to the sum and difference of two quantities one of which is a constant and one of which includes a variable, means connecting one of said circuits in each of two arms of said bridge, and means connecting two of said circuits in series in a third arm of said bridge, said bridge thereby having a quartic balance equation in two variables, of the same form as the equation of the path to be followed in by-polar coordinates on two points of known location as poles: and means for adjusting said bridge so that the coefficients of its equation are identical with those of the equation for the particular path and the variables of its equation are identical with the distances between said craft and said points; and means responsive to unbalance of said bridge.

10. Means for indicating departure of a craft from a predetermined path having a quartic equation of the form $$(d_2^2-d_1^2)^2+K_1d_1^2+K_2d_2^2+K_3=0$$

in terms of distances $d_1$ and $d_2$ from two known points comprising, in combination: a normally energized impedance bridge having a first impedance arm of magnitude $$\left(\frac{a^2-(d_1+d_2)^2}{2a}\right)$$

a second impedance arm of magnitude $$\left(\frac{D^2-d_1^2}{2D}+\frac{F^2-d_2^2}{2F}\right)$$

a third impedance arm of magnitude E, and a fourth impedance arm of magnitude $$\left(\frac{a^2-(d_2-d_1)^2}{2a}\right)$$

where $a$, D, E, and F are adjustable constants and $d_1$ and $d_2$ are continuous variables, the balance equation of the bridge being $$(d_2^2-d_1^2)^2+2a^2(E/D-1)d_1^2+\\2a^2(E/F-1)d_2^2+a^4-2a^2E(D+F)=0$$

means for adjusting impedance members in said bridge to set $a$, D, E and F severally to values making the coefficients of the bridge equation equal to the coefficients of the quartic equation of the predetermined path; means for continually adjusting impedance members in said bridge to maintain $d_1$ and $d_2$ proportional to the distances between said craft and said points; and means indicating the magnitude and sense of the unbalance of said bridge.

11. Means for indicating departure of a craft from a predetermined path having a quartic equation of the form $$(d_2^2-d_1^2)^2+K_1d_1^2+K_2d_2^2+K_3=0$$

in terms of distances $d_1$ and $d_2$ from two known points comprising, in combination: a normally energized electric bridge having a first impedance arm of magnitude $$\frac{a^2-(d_1+d_2)^2}{2a}$$

a second impedance arm of magnitude $$\frac{D^2-d_1^2}{2D}+\frac{F^2-d_2^2}{2F}$$

a third impedance arm of magnitude E, and a fourth impedance arm of magnitude $$\frac{a^2-(d_2-d_1)^2}{2a}$$

where $a$, D, E, and F are adjustable constants and $d_1$ and $d_2$ are continuous variables, the balance equation of the bridge being $$(d_2^2-d_1^2)^2+2a^2(E/D-1)d_1^2+\\2a^2(E/F-1)d_2^2+a^4-2a^2E(D+F)=0$$

means, each calibrated in terms of one of said adjustable constants, for severally adjusting said bridge to set said constants individually to values making the coefficients of the bridge equation equal to the coefficients of the quartic equation of the predetermined path; means for continually adjusting impedance members in said bridge to maintain $d_1$ and $d_2$ proportional to the distances between said craft and said points; and means indicating the magnitude and sense of the unbalance of said bridge.

12. Means for indicating departure of a craft from a predetermined path having a quartic equation of the form $$(d_2^2-d_1^2)^2+K_1d_1^2+K_2d_2^2+K_3=0$$

in terms of distances $d_1$ and $d_2$ from two known points comprising, in combination: a normally energized electric bridge having a first impedance arm of magnitude $$\frac{a^2-(d_1+d_2)^2}{2a}$$

a second impedance arm of magnitude $$\left(\frac{D^2-d_1^2}{2D}+\frac{F^2-d_2^2}{2F}\right)$$

a third impedance arm of magnitude E, and a fourth impedance arm of magnitude $$\frac{a^2-(d_2-d_1)^2}{2a}$$

said first impedance arm comprising a parallel circuit of two impedance assemblies, one of said assemblies having a magnitude $(a-d_1-d_2)$ and the other having a magnitude $(a+d_1+d_2)$, where $a$, D, E, and F are adjustable constants and $d_1$ and $d_2$ are continuous variables, the balance equation of the bridge being $$(d_2^2-d_1^2)^2+2a^2(E/D-1)d_1^2+\\2a^2(E/F-1)d_2^2+a^4-2a^2E(D+F)=0$$

means for adjusting impedance members in said bridge to set $a$, D, E and F to values making the coefficients of the bridge equation equal to the coefficients of the quartic equation of the predetermined path; means for continually adjusting impedance members in said bridge to maintain $d_1$ and $d_2$ proportional to the distances between said craft and said points; and means indicating the magnitude and sense of the unbalance of said bridge.

13. Means for indicating departure of a craft from a predetermined path having a quartic equation of the form $$(d_2^2-d_1^2)^2+K_1d_1^2+K_2d_2^2+K_3=0$$

in terms of distances $d_1$ and $d_2$ from two known points comprising, in combination: a normally energized electric bridge having a first impedance arm of magnitude $$\left(\frac{a^2-(d_1+d_2)^2}{2a}\right)$$

a second impedance arm of magnitude $$\left(\frac{D^2-d_1^2}{2D}+\frac{F^2-d_2^2}{2F}\right)$$

a third impedance arm of magnitude E, and a fourth impedance arm of magnitude $$\left(\frac{a^2-(d_2-d_1)^2}{2a}\right)$$

said second impedance arm comprising a series circuit of two impedance assemblies, the first of said assemblies having an impedance $$\left(\frac{D^2-d_1^2}{2D}\right)$$

and the second of said assemblies having an $$\left(\frac{F^2-d_2^2}{2F}\right)$$

said first assembly comprising impedances of magnitudes $(D+d_1)$ and $(D-d_1)$ connected in parallel, and said second assembly comprising impedances of magnitudes $(F+d_2)$ and $(F-d_2)$ connected in parallel, where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+2a^2(E/F-1)d_2{}^2+a^4-2a^2E(D+F)=0$$

means for adjusting impedance members in said bridge to set $a$, $D$, $E$, and $F$ to values making the coefficients of the bridge equation equal to the coefficients of the quartic equation of the predetermined path, means for continually adjusting impedance members in said bridge to maintain $d_1$ and $d_2$ proportional to the distances between said craft and said points; and means indicating the magnitude and sense of the unbalance of said bridge.

14. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance of magnitude.

$$\left(\frac{a^2-(d_1+d_2)^2}{2a}\right)$$

a second impedance arm of magnitude $$\left(\frac{D^2-d_1{}^2}{2D}+\frac{F^2-d_2{}^2}{2F}\right)$$

a third impedance arm of magnitude $E$, and a fourth impedance arm of magnitude $$\left(\frac{a^2-(d_2-d_1)^2}{2a}\right)$$

said fourth impedance arm comprising a parallel circuit of two impedance assemblies, the first of said assemblies having a magnitude $(a-d_2+d_1)$ and the second having a magnitude $(a+d_2-d_1)$, where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+2a^2(E/F-1)d_2{}^2+a^4-2a^2E(D+F)=0$$

means for adjusting impedance members in said bridge to set $a$, $D$, $E$, and $F$ to values making the coefficients of the bridge equation equal to the coefficients of the quartic equation of the predetermined path; means for continually adjusting impedance members in said bridge to maintain $d_1$ and $d_2$ proportional to the distances between said craft and said points; and means indicating the magnitude and sense of the unbalance of said bridge.

15. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\left(\frac{a^2-(d_1+d_2)^2}{2a}\right)$$

a second impedance arm of magnitude $$\left(\frac{D^2-d_1{}^2}{2D}+\frac{F^2-d_2{}^2}{2F}\right)$$

a third impedance arm of magnitude $E$, and a fourth impedance arm of magnitude $$\left(\frac{a^2-(d_2-d_1)^2}{2a}\right)$$

said first impedance arm comprising a parallel circuit of two impedance assemblies, one of said assemblies having a magnitude $(a-d_1-d_2)$ and the other having a magnitude $(a+d_1+d_2)$, said second impedance arm comprising a series circuit of two impedance assemblies, the first of said assemblies having an impedance $$\left(\frac{D^2-d_1{}^2}{2D}\right)$$

and the second of said assemblies having an impedance $$\left(\frac{F^2-d_2{}^2}{2F}\right)$$

said first assembly comprising impedances of magnitudes $(D+d_1)$ and $(D-d_1)$ connected in parallel, and said second assembly comprising impedances of magnitudes $(F+d_2)$ and $(F-d_2)$ connected in parallel, said fourth impedance arm comprising a parallel circuit of two impedance assemblies, the first of said assemblies having a magnitude $(a-d_2+d_1)$ and the second having a magnitude $(a+d_2-d_1)$, where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+2a^2(E/F-1)d_2{}^2+a^4-2a^2E(D+F)=0$$

means for adjusting impedance members in said bridge to set $a$, $D$, $E$, and $F$ to values making the coefficients of the bridge equation equal to the coefficients of the quartic equation of the predetermined path; means for continually adjusting impedance members in said bridge to maintain $d_1$ and $d_2$ proportional to the distances between said craft and said points, and means indicating the magnitude and sense of the unbalance of said bridge.

16. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\left(\frac{a^2-(d_1+d_2)^2}{2a}\right)$$

a second impedance arm of magnitude $$\left(\frac{D^2-d_1{}^2}{2D}+\frac{F^2-d_2{}^2}{2F}\right)$$

a third impedance arm of magnitude $E$, and a fourth impedance arm of magnitude $$\left(\frac{a^2-(d_2-d_1)^2}{2a}\right)$$

where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+2a^2(E/F-1)d_2{}^2+a^4-2a^2E(D+F)=0$$

first motor means actuated through a rotation which is proportional to the distance $d_1$ between said craft and one of said points; second motor means actuated through a rotation which is proportional to the distance $d_2$ between said craft and the other of said points; means, including rotation combining means, for varying impedance members in said bridge in accordance with the values of $d_1$, $d_2$, $(d_1+d_2)$, and $(d_2-d_1)$, respectively; and means indicating the magnitude and sense of the unbalance of said bridge.

17. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\left(\frac{a^2-(d_1+d_2)^2}{2a}\right)$$

a second impedance arm of magnitude $$\left(\frac{D^2-d_1{}^2}{2D}+\frac{F^2-d_2{}^2}{2F}\right)$$

a third impedance arm of magnitude E, and a fourth impedance arm of magnitude $$\left(\frac{a^2-(d_2-d_1)^2}{2a}\right)$$

where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+\\2a^2(E/F-1)d_2{}^2+a^4-2a^2E(D+F)=0$$

manually operable knobs for rotation through total angles proportional to D and F respectively; first and second motor means actuated through rotations which are proportional to the distances $d_1$ and $d_2$, respectively; means for mechanically adding and subtracting said rotations whereby to obtain rotations of magnitude $(D+d_1)$, $(D-d_1)$, $(F+d_2)$, and $(F-d_2)$; means for adjusting impedance members in said bridge in accordance with said last named rotations; and means indicating the magnitude and sense of the unbalance of said bridge.

18. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\frac{a^2-(d_1+d_2)^2}{2a}$$

a second impedance arm of magnitude $$\left(\frac{D^2-d_1{}^2}{2D}+\frac{F^2-d_2{}^2}{2F}\right)$$

a third impedance arm of magnitude E, and a fourth impedance arm of magnitude $$\left(\frac{a^2-(d_2-d_1)^2}{2a}\right)$$

where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+\\2a^2(E/F-1)d_2{}^2+a^4-2a^2E(D+F)=0$$

manually operable knobs for rotation through total angles proportional to D and F respectively; first and second motor means actuated through rotations which are proportional to the distances $d_1$ and $d_2$, respectively; means for mechanically adding and subtracting said rotations whereby to obtain rotations of magnitude $(D+d_1)$, $(D-d_1)$, $(F+d_2)$, $(F-d_2)$, $(d_1+d_2)$, and $(d_2-d_1)$; means for adjusting impedance members in said bridge in accordance with said last named rotations; and means indicating the magnitude and sense of the unbalance of said bridge.

19. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\frac{a^2-(d_1+d_2)^2}{2a}$$

a second impedance arm of magnitude $$\left(\frac{D^2-d_1{}^2}{2D}+\frac{F^2-d_2{}^2}{2F}\right)$$

a third impedance arm of magnitude E, and a fourth impedance arm of magnitude $$\left(\frac{a^2-(d_2-d_1)^2}{2a}\right)$$

said first impedance arm comprising a parallel circuit of two impedance assemblies, one of said assemblies having a magnitude $(a-d_1-d_2)$ and the other having a magnitude $(a+d_1+d_2)$, where $a$, $D$, $E$, and $F$ are adjustable constants and $d_1$ and $d_2$ are continuous variables, the balance equation of the bridge being $$(d_2{}^2-d_1{}^2)^2+2a^2(E/D-1)d_1{}^2+\\2a^2(E/F-1)d_2{}^2+a^4-2a^2E(D+F)=0$$

manually operable means for movement through a rotation corresponding to a desired value for $a$; first and second motor means actuated through rotations which are proportional to the distances $d_1$ and $d_2$, respectively, mechanical means for adding and subtracting said rotations to obtain rotations proportional to $a-(d_1+d_2)$ and $a+(d_1+d_2)$; means transmitting said added and subtracted rotations to variable impedances in said first arm of said bridge; and means indicating the magnitude and sense of the unbalance of said bridge.

20. Means for indicating departure of a craft from a predetermined path having a quartic equation of the form $$(d_2{}^2-d_1{}^2)^2+K_1 d_1{}^2+K_2 d_2{}^2+K_3=0$$

in terms of distances $d_1$ and $d_2$ from two known points comprising, in combination: a normally energized electric bridge having a first impedance arm of magnitude $$\frac{a^2-(d_1+d_2)^2}{2a}$$

a second impedance arm of magnitude $$\frac{D^2-d_1{}^2}{2D}+\frac{F^2-d_2{}^2}{2F}$$

a third impedance arm of magnitude E, and a fourth impedance arm of magnitude $$\frac{a^2-(d_2-d_1)^2}{2a}$$

said first impedance arm comprising a parallel circuit of two impedance assemblies, one of said assemblies having a magnitude $a-d_1-d_2$ and the other having a magnitude $a+d_1+d_2$, said fourth impedance arm comprising a parallel circuit of two impedance assemblies, the first of said assemblies having a magnitude $a-d_2+d_1$ and the second having a magnitude $a+d_2-d_1$, where $a$, D, E, and F are adjustable constants and $d_1$ and $d_2$ are continuous variables, the balance equation of the bridge being $$(d_2{}^2-d_1{}^2)^2+2a^2(E/D-1)d_1{}^2+\\2a^2(E/F-1)d_2{}^2+a^4-2a^2E(D+F)=0$$

manually operable means for movement through a rotation corresponding to a desired value for $a$; first and second motor means actuated through rotations which are proportional to the distances $d_1$ and $d_2$ respectively, mechanical means for adding and subtracting said rotations to obtain rotations proportional to $a-(d_1+d_2)$, $a+(d_1+d_2)$, $a-(d_1-d_2)$, and $a+(d_1-d_2)$; means transmitting said added and subtracted rotations to variable impedance in said first and fourth arms of said bridge; and means indicating the magnitude and sense of the unbalance of said bridge.

21. Means for indicating departure of a craft from a predetermined path having a quartic equation in terms of distances $d_1$ and $d_2$ from two known points, which degenerates to a quadratic equation of the form $d_1{}^2-d_2{}^2-K_4=0$ for paths perpendicular to the line joining the points, comprising, in combination: a normally energized electric bridge having a first impedance arm of magnitude $$\frac{a^2-(d_1+d_2)^2}{2a}$$

a second impedance arm of magnitude $$\frac{D^2-d_1{}^2}{2D}+\frac{F^2-d_2{}^2}{2F}$$

a third impedance arm of magnitude E, and a fourth impedance arm of magnitude $$\frac{a^2-(d_2-d_1)^2}{2a}$$

where $a$, D, E, and F are adjustable constants and $d_1$ and $d_2$ are continuous variables, the balance equation of the bridge being $$(d_2{}^2-d_1{}^2)^2+2a^2(E/D-1)d_1{}^2+\\2a^2(E/F-1)d_2{}^2+a^4-2a^2E(D+F)=0$$

means for adjusting impedance members in said bridge to set $a$, D, E, and F to values making the coefficients of the bridge equation equal to the coefficients of the quartic equation of the predetermined path; means for continually adjusting impedance members in said bridge to maintain $d_1$ and $d_2$ proportional to the distances between said craft and said points; means indicating the magnitude and sense of the unbalance of said bridge, and switch means unitarily converting the magnitude of said first impedance arm to $d_1+d_2$, that of said second impedance arm to a fixed constant, and that of said fourth impedance arm to $(d_2-d_1)$ plus a second fixed constant.

22. Means for indicating departure of a craft from a predetermined path comprising, first and second means motor actuable through rotations of magnitudes $d_1$ and $d_2$ respectively, first and second means manually actuable through rotations of magnitudes D and F respectively, mechanical means combining said various rotations to yield rotations of magnitudes $D+d_1$, $D-d_1$, $F+d_2$, and $F-d_2$, a plurality of variable resistors, means varying the resistance of one of said resistors from a zero position in accordance with the value of each of said magnitudes, further mechanical means combining said motor actuated rotations to yield rotations of magnitudes $d_1+d_2$ and $d_2-d_1$, further mechanical means varying the resistances of further resistors of said plurality in accordance with the magnitude of a quantity $a$, mechanical means independently further varying the resistances of said last named resistors to values $a+d_1+d_2$, $a-d_1+d_2$, $a-d_2+d_1$, and $a+d_2-d_1$, means connecting said resistors to comprise arms of a bridge circuit such that the first named four of said resistors comprise one arm of said bridge, the last named two of said resistors comprise a further arm of said bridge, and the remaining resistors comprise a still further arm of said bridge, a further variable resistor comprising the fourth arm of said bridge and means varying the resistance of said last named resistor in accordance with the magnitude of a quantity E.

23. Means for supervising the movement of a vehicle in an area comprising radio transmitting means carried by the vehicle, first and second radio relaying means located at known points within the area, radio receiving means carried by the vehicle and giving a first output proportional to the distance between the vehicle and the first radio relaying means, and giving a second output proportional to the distance between the vehicle and the second radio relaying means, a balanceable computer having a balance equation of the same general form as the equations of straight lines in said area when expressed in bipolar coordinates on the relaying means as poles, where the distances from the vehicle to the relaying means are the independent variables of the equation, means in said computer for adjusting the constants of its balance equation to make it identical with the equation of a particular line of the area, means in said computer adjustable in accordance with the values of said independent variables, means connecting the outputs of said radio receiving means to said adjustable means, and means responsive to unbalance of said computer to indicate displacement of the vehicle from the particular line.

24. Means for indicating departure of a craft from a predetermined path with respect to two spaced points of known location comprising, in combination, distance responsive means continuously determining the distances between said craft and said points, balanceable apparatus having a plurality of means for adjusting the same to vary the output effect thereof, and means for continuously adjusting different ones of said adjusting means in accordance with said distances, said balanceable apparatus having an output effect which is zero when the adjustments of said adjustment means have a predetermined relationship which exists only when said craft is on said path.

25. Means for indicating departure of a craft from a desired path, comprising, in combination: means responsive to the distances from said craft to a pair of spaced points of known location relative to said path; continuously energized impedance means connected to give a zero output in a balanced relation thereof; means for continuously causing a first adjustment of said impedance means in accordance with the responses of said distance responsive means; further means for adjusting said impedance means so that, when said first adjustment is made in accordance with responses of said responsive means corresponding to a position of said craft on said path, said balanced relation is brought about; and means indicating that said balanced relation exists.

26. Apparatus of the class described comprising, in combination: a balanceable impedance bridge, including first and second pairs of variable impedances connected in parallel and means connecting each of said pairs of impedances in one of two opposite arms of said bridge; and means increasing the impedance of one member of each pair, and simultaneously decreasing the impedance of the other member of each pair, linearly with a variable quantity, so that the bridge output varies as a quartic function of said variable quantity.

27. Apparatus for indicating departure of a dirigible craft from a desired path with respect to two spaced points of known location relative to the path, comprising, in combination: radio responsive means for continuously supplying outputs in accordance with the actual distances from the craft to the two points; computing means deriving from said outputs a signal representative of the actual location of the craft relative to the path, said computing means comprising a balanceable network including impedances variable in accordance with said distances and further impedances manually adjustable to give the network the characteristic of being balanced for all sets of values of said outputs corresponding to positions of the craft on the path, and of being oppositely unbalanced for all sets of values of said outputs corresponding to positions of the craft on opposite sides of the path; and means energized with said signal to indicate the amount and direction of any deviation of the craft from the path.

WILLIAM K. ERGEN.

REFERENCES CITED

The following references are of record in the file of this patent:

UNITED STATES PATENTS

| Number | Name | Date |
|---|---|---|
| 2,080,186 | Reymond | May 11, 1937 |
| 2,108,146 | Simpson | Feb. 15, 1938 |
| 2,137,133 | Dallmann | Nov. 15, 1938 |
| 2,137,847 | Libman | Nov. 22, 1938 |
| 2,405,238 | Seeley | Aug. 6, 1946 |
| 2,405,239 | Seeley | Aug. 6, 1946 |
| 2,416,223 | Sanders | Feb. 18, 1947 |
| 2,417,033 | Wolff | Mar. 4, 1947 |
| 2,417,098 | Wilcox | Mar. 11, 1947 |
| 2,446,191 | Pemberton | Aug. 3, 1948 |
| 2,450,991 | Sanders | Oct. 12, 1948 |
| 2,453,607 | Wardle | Nov. 9, 1948 |
| 2,472,129 | Streeter | June 7, 1948 |
| 2,480,208 | Alvarez | Aug. 30, 1949 |

Certificate of Correction

Patent No. 2,614,251 October 14, 1952

WILLIAM K. ERGEN

It is hereby certified that error appears in the printed specification of the above numbered patent requiring correction as follows:

Column 9, line 37, for "resistors" read *resistor*; column 18, line 55, strike out "components of the instru-" and insert instead *limits for $d_1$ and $d_2$, but that*; column 22, line 43, for "of balance" read *of its balance*; line 70, for "by-polar" read *bi-polar*; column 24, line 70, after "an" insert *impedance*; column 29, line 23, after "equation" insert *of the form $(d_2{}^2-d_1{}^2)^2+K_1d_1{}^2+K_2d_2{}^2+K_3=0$*; and that the said Letters Patent should be read as corrected above, so that the same may conform to the record of the case in the Patent Office.

Signed and sealed this 21st day of July, A. D. 1953.

[SEAL]

THOMAS F. MURPHY,
*Assistant Commissioner of Patents.*